(12) United States Patent
Takemoto et al.

(10) Patent No.: US 11,300,197 B2
(45) Date of Patent: Apr. 12, 2022

(54) DIFFERENTIAL DEVICE MEASURING TOOL AND LUBRICATING OIL AMOUNT MEASURING METHOD FOR DIFFERENTIAL DEVICE

(71) Applicant: MUSASHI SEIMITSU INDUSTRY CO., LTD., Toyohashi (JP)

(72) Inventors: Hiroshi Takemoto, Toyohashi (JP); Fumiya Yamamoto, Toyohashi (JP); Ryota Ishino, Toyohashi (JP); Akuto Sekiguchi, Toyohashi (JP); Osamu Ogane, Toyohashi (JP)

(73) Assignee: Musashi Selmitsu Industry Co., Ltd., Aichi (JP)

( * ) Notice: Subject to any disclaimer, the term of this patent is extended or adjusted under 35 U.S.C. 154(b) by 429 days.

(21) Appl. No.: 16/660,173

(22) Filed: Oct. 22, 2019

(65) Prior Publication Data

US 2020/0191255 A1    Jun. 18, 2020

(30) Foreign Application Priority Data

Dec. 13, 2018    (JP) .............................. JP2018-233072

(51) Int. Cl.
*F16H 57/04* (2010.01)
*F16H 57/02* (2012.01)
*F16H 57/00* (2012.01)

(52) U.S. Cl.
CPC ....... *F16H 57/042* (2013.01); *F16H 57/0483* (2013.01); *F16H 2057/0062* (2013.01);
(Continued)

(58) Field of Classification Search
CPC ............... F16H 57/042; F16H 57/0483; F16H 2057/0062; F16H 2057/0087;
(Continued)

(56) References Cited

U.S. PATENT DOCUMENTS

| 2010/0311533 A1* | 12/2010 | Balenda, II ............. F16H 48/30 475/231 |
| 2014/0346119 A1* | 11/2014 | Ammler ............... F16H 57/0402 210/739 |
| 2015/0002677 A1* | 1/2015 | Peret ................. A61M 5/16886 348/160 |

FOREIGN PATENT DOCUMENTS

| CA | 2841979 A1 * | 2/2013 | ......... F16H 57/0447 |
| JP | 2014-105838 A | 6/2014 | |

* cited by examiner

*Primary Examiner* — Justin Holmes
(74) *Attorney, Agent, or Firm* — Carrier Blackman & Associates, P.C.; Joseph P. Carrier; William D. Blackman

(57) ABSTRACT

The differential device measuring tool measures an inflow amount of lubricating oil flowing into a housing space through a communication hole during the rotation of a differential case having a case main body in which the housing space and the communication hole are formed and a bearing boss having a through-hole protruding from the case main body and communicating with the housing space. The measuring tool has a collecting portion and a deriving portion. The collecting portion does not interfere with the rotating differential case in the housing space in which the differential gear mechanism is not housed, and has a recess opening and collects the lubricating oil flowing into the housing space through the communication hole. The deriving portion is inserted through the through-hole of the bearing boss and have a deriving flow channel. The deriving flow channel communicates with the recess, and extends to the outside.

20 Claims, 9 Drawing Sheets

(52) U.S. Cl.
CPC ............... *F16H 2057/0087* (2013.01); *F16H 2057/02017* (2013.01); *F16H 2057/02026* (2013.01)

(58) Field of Classification Search
CPC . F16H 2057/02017; F16H 2057/02026; F16H 57/043; F16H 48/38; F16H 57/0447; F16H 48/40; F16H 57/0405; F16H 57/0449; G01F 22/00; F01M 2250/00; F01P 2025/00; F16N 2250/00
See application file for complete search history.

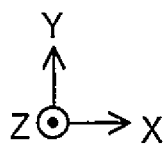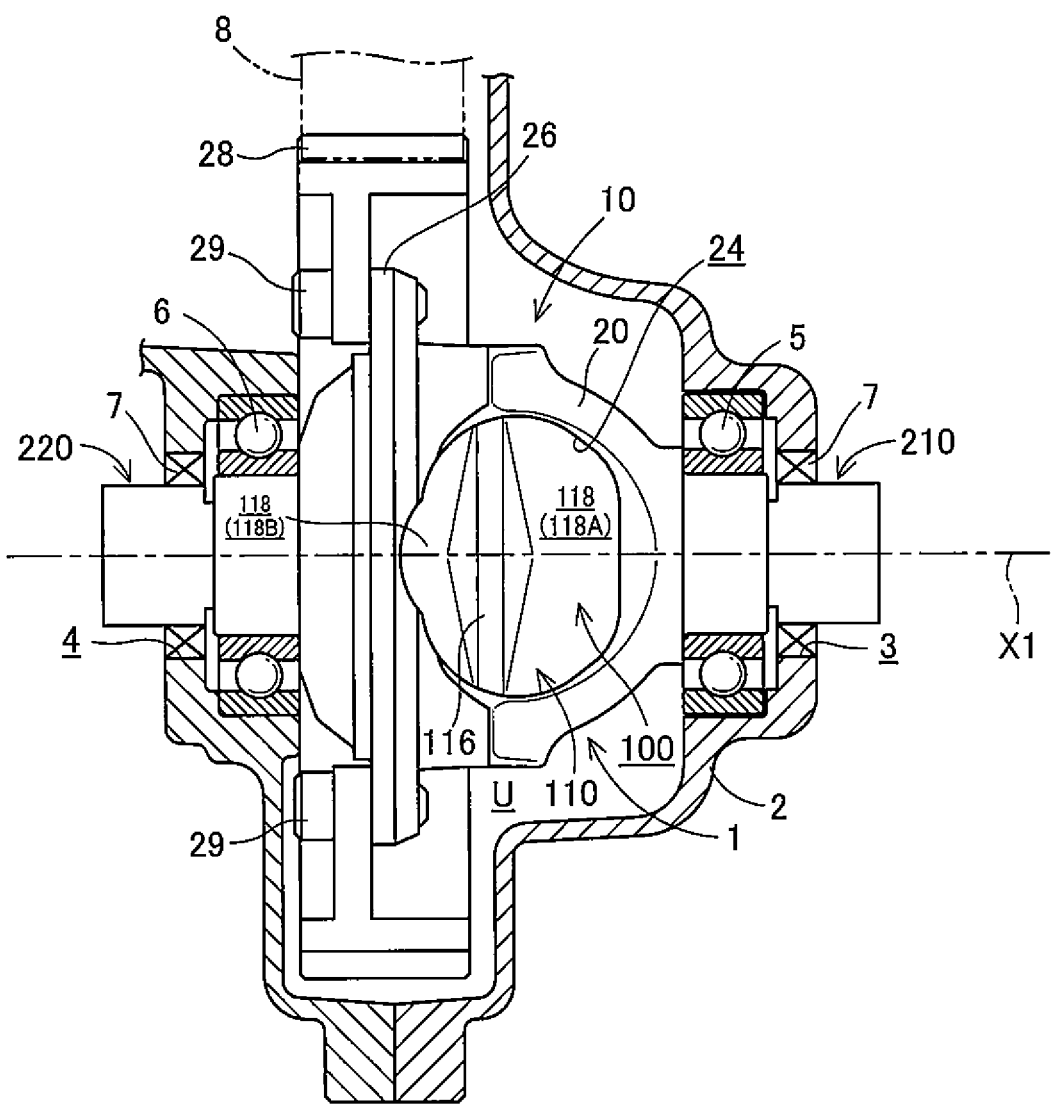
FIG.2

DIFFERENTIAL DEVICE MEASURING TOOL AND LUBRICATING OIL AMOUNT MEASURING METHOD FOR DIFFERENTIAL DEVICE

CROSS REFERENCE TO RELATED APPLICATION

The present application claims priority under to Japanese Patent Application No. 2018-233072 filed on Dec. 13, 2018, which is incorporated herein by reference.

BACKGROUND

The present disclosure relates to a differential device measuring tool and a lubricating oil amount measuring method for a differential device.

A differential device is provided with a differential gear mechanism and a differential case for housing the differential gear mechanism. The differential gear mechanism includes, for example, a pinion shaft supported on the differential case, a pair of pinion gears rotatably supported on the pinion shaft, and a pair of side gears respectively connected to left and right drive shafts and meshing with the pair of pinion gears. The differential case includes a case main body and a bearing boss. The case main body is formed with a housing space for housing the differential gear mechanism and a communication hole for communicating inside and outside of the housing space. The bearing boss protrudes from the case main body, has a cylindrical shape having a through-hole communicating with the housing space of the case main body, and is rotatably supported about a predetermined rotation axis.

To the differential case, a ring gear for transmitting power from a power source is fixed. When the ring gear is rotationally driven, the differential case is also rotationally driven in accordance with the rotation of the ring gear, whereby the driving force is transmitted to the left and right drive shafts via the pair of pinion gears and the pair of side gears. Further, during the rotation of the differential case, lubricating oil flows into the housing space through the communication hole formed in the differential case and is supplied to the differential gear mechanism, whereby the smooth operation of the differential gear mechanism is maintained.

SUMMARY

In order to maintain the smooth operation of the differential gear mechanism, it is necessary to allow an appropriate amount of lubricating oil to flow into the housing space of the differential case during rotation. However, conventionally, there has been no method for measuring the amount of lubricating oil flowing into the housing space of the differential case during rotation. Therefore, in order to determine whether an appropriate amount of lubricating oil is supplied to the differential gear mechanism, it has been necessary to actually drive the differential device to confirm seizure and damage, among other problems, of each component member of the differential gear mechanism.

An object of the present disclosure is to provide a differential device measuring tool and a lubricating oil amount measuring method for a differential device capable of solving the above mentioned problem.

In order to achieve the above object, a differential device measuring tool of the present disclosure for measuring an inflow amount of a lubricating oil flowing into a housing space through a communication hole during rotation of a differential case that includes: a case main body having the housing space for housing a differential gear mechanism and the communication hole for communicating inside and outside of the housing space; and a cylindrical bearing boss protruding from the case main body, having a through-hole communicating with the housing space, and rotatably supported about a predetermined rotation axis, includes: a collecting portion housed in the housing space where the differential gear mechanism is not housed, arranged so as not to interfere with the rotating differential case, and having a recess opened in a direction substantially orthogonal to the rotation axis for collecting a lubricating oil flowing into the housing space through the communication hole; and a deriving portion inserted into the through-hole of the bearing boss, and having a deriving flow channel, the deriving flow channel communicating with the recess of the collecting portion, and extending to the outside of the differential case through the bearing boss.

The differential device measuring tool is provided with a collecting portion and a deriving portion. The collecting portion is disposed in the housing space of the differential case so as not to interfere with the rotating differential case, and has a recess for collecting the lubricating oil flowing into the housing space through the communication hole in accordance with the rotation of the differential case. The deriving portion is inserted into the through-hole of the bearing boss of the differential case and has a deriving flow channel communicating with the recess of the collecting portion and extending to the outside of the differential case through the bearing boss. This differential device measuring tool is arranged in the housing space of the differential case, and is fixed in an attitude in which the recess of the collecting portion opens upward. When the differential case rotates, the lubricating oil scattered in accordance with this rotation or supplied to the differential case flows into the housing space through the communication hole of the differential case during rotation, is collected in the recess of the collecting portion, and is derived from the deriving portion to the outside of the differential case. Therefore, by measuring the amount of the lubricating oil derived from the deriving portion, it is possible to measure the amount of the lubricating oil flowing into the housing space of the differential case during rotation. As a result, it can be determined whether or not an appropriate amount of lubricating oil can be supplied to the differential gear mechanism without actually confirming seizure and damage, among other problems, of each component member of the differential gear mechanism.

In the differential device measuring tool of the present disclosure, in a state in which the communication hole of the differential case faces the recess of the collecting portion, when the housing space is viewed from the communication hole, an inner peripheral line of the recess coincides with the communication hole or is positioned outside the communication hole throughout the entire circumference. This improves the collection rate of the lubricating oil flowing into the housing space through the communication hole of the differential case, and enables the measurement of the inflow amount of the lubricating oil.

In the differential device measuring tool of the present disclosure, an outer peripheral line of the collecting portion as viewed from the recess and an inner wall of the case main body on a virtual plane including the rotation axis are close to each other throughout the entire circumference. Thus, the lubricating oil flowing into the housing space of the differential case can be collected without leakage, and the inflow amount of the lubricating oil can be measured more accurately.

In the differential device measuring tool of the present disclosure, a distance between an open end of the recess of the collecting portion and the rotation axis is equal to or less than the shortest distance between the communication hole of the differential case and the rotation axis. As a result, as compared with the case where the distance of the recess is longer than the shortest distance between the communication hole of the differential case and the rotation axis, the communication hole is less likely to be blocked by the collecting portion even when the differential case rotates, and the inflow amount of the lubricating oil can be measured more accurately.

In the differential device measuring tool of the present disclosure, the collecting portion has a plurality of the recesses, and the deriving portion is formed with a plurality of the deriving flow channels individually communicating with each of the plurality of recesses. Thus, for example, the supply balance (distribution) of the lubricating oil to the housing space of the differential case can be grasped based on the amount of the lubricating oil derived from each of the plurality of deriving flow channels.

In the differential device measuring tool of the present disclosure, a bottom of the recess of the collecting portion is inclined downward toward the deriving flow channel of the deriving portion. As a result, the lubricating oil collected in the recess can smoothly flow toward the deriving portion.

In the differential device measuring tool of the present disclosure, the bottom of the recess is inclined downward toward the center of the bottom as viewed from a direction along the rotation axis. As a result, it is possible to prevent the lubricating oil once entering the recess from bouncing back at the bottom surface of the recess and jumping out of the recess.

In the differential device measuring tool of the present disclosure, the bottom of the deriving flow channel is inclined downward from the recess toward a deriving end of the deriving portion. As a result, the lubricating oil flowing into the deriving flow channel from the recess of the collecting portion can be smoothly guided to the deriving side of the deriving flow channel by free fall due to its own weight.

In the differential device measuring tool of the present disclosure, the bottom of the deriving flow channel is formed with a stepped surface facing toward the deriving end of the deriving flow channel. As a result, it is possible to prevent the lubricating oil flowing into the deriving flow channel from flowing back toward the recess.

In addition, a lubricating oil amount measuring method for a differential device of the present disclosure for measuring an inflow amount of a lubricating oil flowing into a housing space through a communication hole during rotation of a differential case that includes a case main body having the housing space for housing a differential gear mechanism and the communication hole for communicating inside and outside of the housing space, and a cylindrical bearing boss protruding from the case main body, having a through-hole communicating with the housing space, and rotatably supported about a predetermined rotation axis, includes: a fixing step of fixing a differential device measuring tool that includes a collecting portion housed in the housing space where the differential gear mechanism is not housed, arranged so as not to interfere with the rotating differential case, and having a recess opened in a direction substantially orthogonal to the rotation axis for collecting a lubricating oil flowing into the housing space through the communication hole, and a deriving portion inserted into the through-hole of the bearing boss, and having a deriving flow channel, the deriving flow channel communicating with the recess of the collecting portion, and extending to the outside of the differential case through the bearing boss in an attitude in which the recess of the collecting portion opens upward; a rotating step of rotating the differential case; and a measuring step of measuring the amount of lubricating oil derived from the deriving flow channel.

In the lubricating oil amount measuring method for a differential device, the differential device measuring tool having the above configuration is arranged in the housing space of the differential case, and is fixed in an attitude in which the recess of the collecting portion opens upward. Then, the differential case is rotated. Then, the lubricating oil scattered in accordance with the rotation or supplied to the differential case flows into the housing space through the communication hole of the rotating differential case, is collected in the recess of the collecting portion, and is derived out of the differential case from the deriving flow channel of the deriving portion. Then, the amount of the lubricating oil derived from the deriving flow channel is measured. Thus, it is possible to measure the inflow amount of the lubricating oil into the housing space of the differential case during rotation. As a result, it can be determined whether or not an appropriate amount of lubricating oil can be supplied to the differential gear mechanism without actually confirming seizure and damage, among other problems, of each component member of the differential gear mechanism.

BRIEF DESCRIPTION OF DRAWINGS

FIG. 2 is a plan view illustrating a part of a differential device measuring tool 100 in the first embodiment.

DETAILED DESCRIPTION

A. First Embodiment

Figure 1:
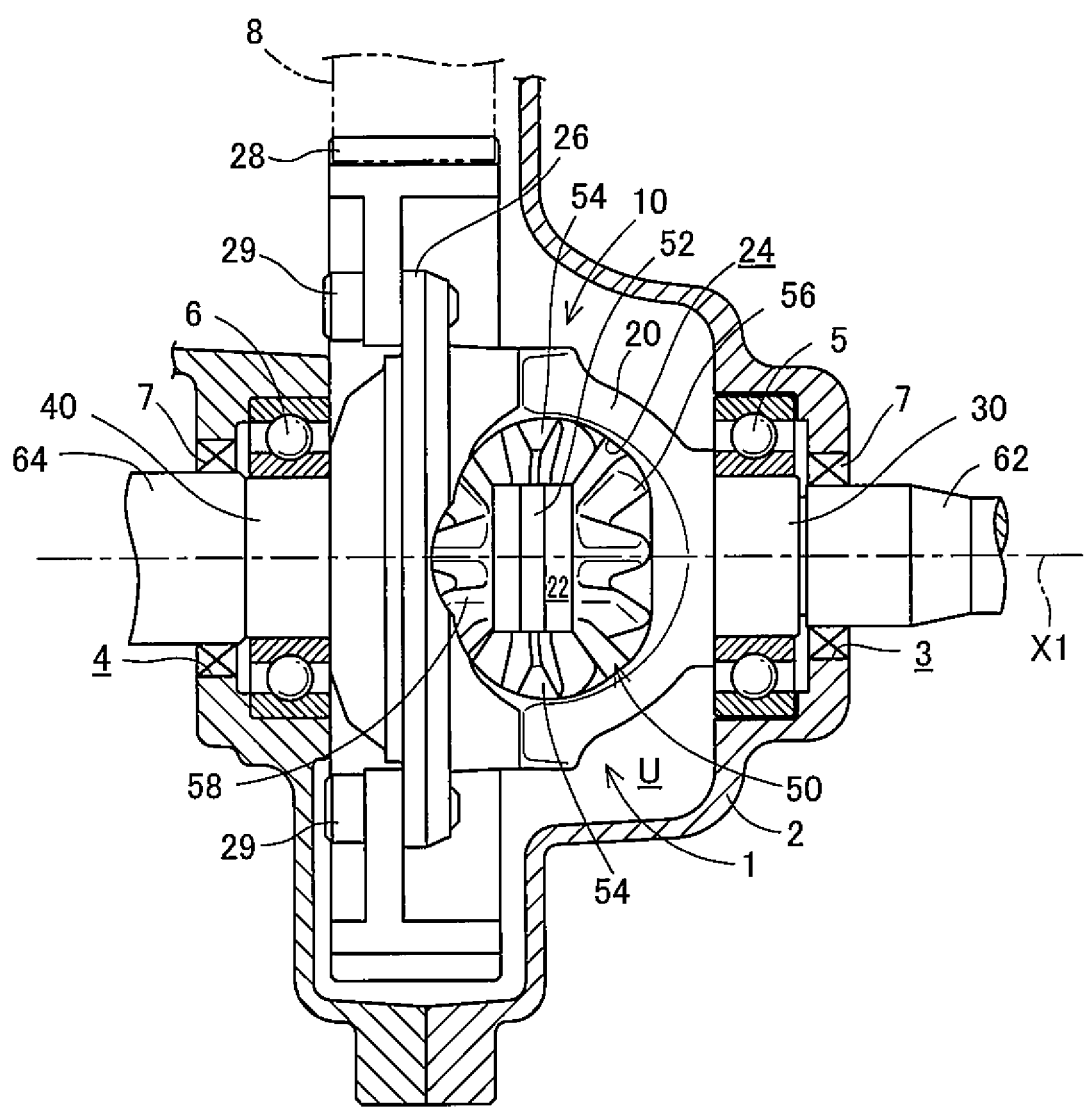
FIG. 1 is a plan view illustrating a differential device 1 according to a first embodiment.

A differential device measuring tool 100 (hereinafter simply referred to as "measuring tool 100") in the present embodiment is arranged in place of a differential gear mechanism 50 of a differential device 1, as will be described later, and is used to measure the inflow amount of the lubricating oil U flowing into a housing space 22 of a differential case 10 during rotation. First, the configuration of the differential device 1 will be described.

A-1. Configuration of Differential Device 1

FIG. 1 is a plan view illustrating the differential device 1 according to the first embodiment. It should be noted that FIG. 1 shows cross sections of a transmission case 2, bearings 5, 6, and a seal member 7 described later. In FIG. 1, mutually orthogonal XYZ axes for specifying the directions are shown. In this description, for convenience, the positive Z-axis direction (direction in front of the paper) is referred to as the upward direction, the negative Z-axis direction (direction directed into the paper) is referred to as the downward direction, the positive X-axis direction is referred to as the right direction, the negative X-axis direction is referred to as the left direction, the positive Y-axis direction is referred to as the forward direction, and the negative Y-axis direction is referred to as the backward direction. The same applies to FIG. 2 and the subsequent drawings, which will be described later.

As shown in FIG. 1, the differential device 1 is housed in a transmission case 2 of an automobile, for example, together with a transmission (not shown). On the right side wall of the transmission case 2, a circular right hole 3 having a predetermined rotation axis (in this embodiment, the rotation axis X1 along the left-right direction (X-axis direction)) as its center is formed, and an annular right bearing 5 having the rotation axis X1 as its center is disposed on the left side (internal space side of the transmission case 2) of the right hole 3. In the left side wall of the transmission case 2, a circular left hole 4 having the rotation axis X1 as its center is formed, and an annular left bearing 6 having the rotation axis X1 as its center is arranged on the right side (internal space side of the transmission case 2) of the left hole 4.

The differential device 1 includes a differential case 10 and a differential gear mechanism 50.

A-1-1. Configuration of Differential Case 10

The differential case 10 is rotatably supported by the pair of bearings 5, 6 in the transmission case 2, and houses the differential gear mechanism 50 therein. Specifically, the differential case 10 includes a case main body 20 and a pair of bearing bosses (a right bearing boss 30 and a left bearing boss 40). The differential case 10 is formed of, for example, metal.

The case main body 20 is, for example, a hollow substantially spherical body. The case main body 20 is formed with a housing space 22 for housing the differential gear mechanism 50. The peripheral wall of the case main body 20 is formed with a pair of access windows 24 that open from the housing space 22 to the outside of the case main body 20. The pair of access windows 24 are formed in the peripheral wall of the case main body 20 at positions opposed to each other across the differential gear mechanism 50 (rotation axis X1). In FIG. 1, one access window 24 is shown because it is positioned in front of (positive Z-axis direction) the differential gear mechanism 50, and the other access window 24 is hidden behind (negative Z-axis direction) the differential gear mechanism 50. It should be noted that, in the assembly process of the differential device 1, the components of the differential gear mechanism 50 are inserted into the housing space 22 of the case main body 20 through the access window 24. The access window 24 is an example of the communication hole in the claims.

The outer peripheral surface of the case main body 20 is provided with an annular flange 26 centering on the rotation axis X1, and a ring gear 28 is fastened to this flange 26 via a bolt 29. The ring gear 28 meshes with an output gear 8 of the transmission. It should be noted that the ring gear 28 may be joined to the flange 26 by welding, among other method, without using the bolt 29. Further, the ring gear 28 may be integrally formed with the case main body 20.

Figure 3:
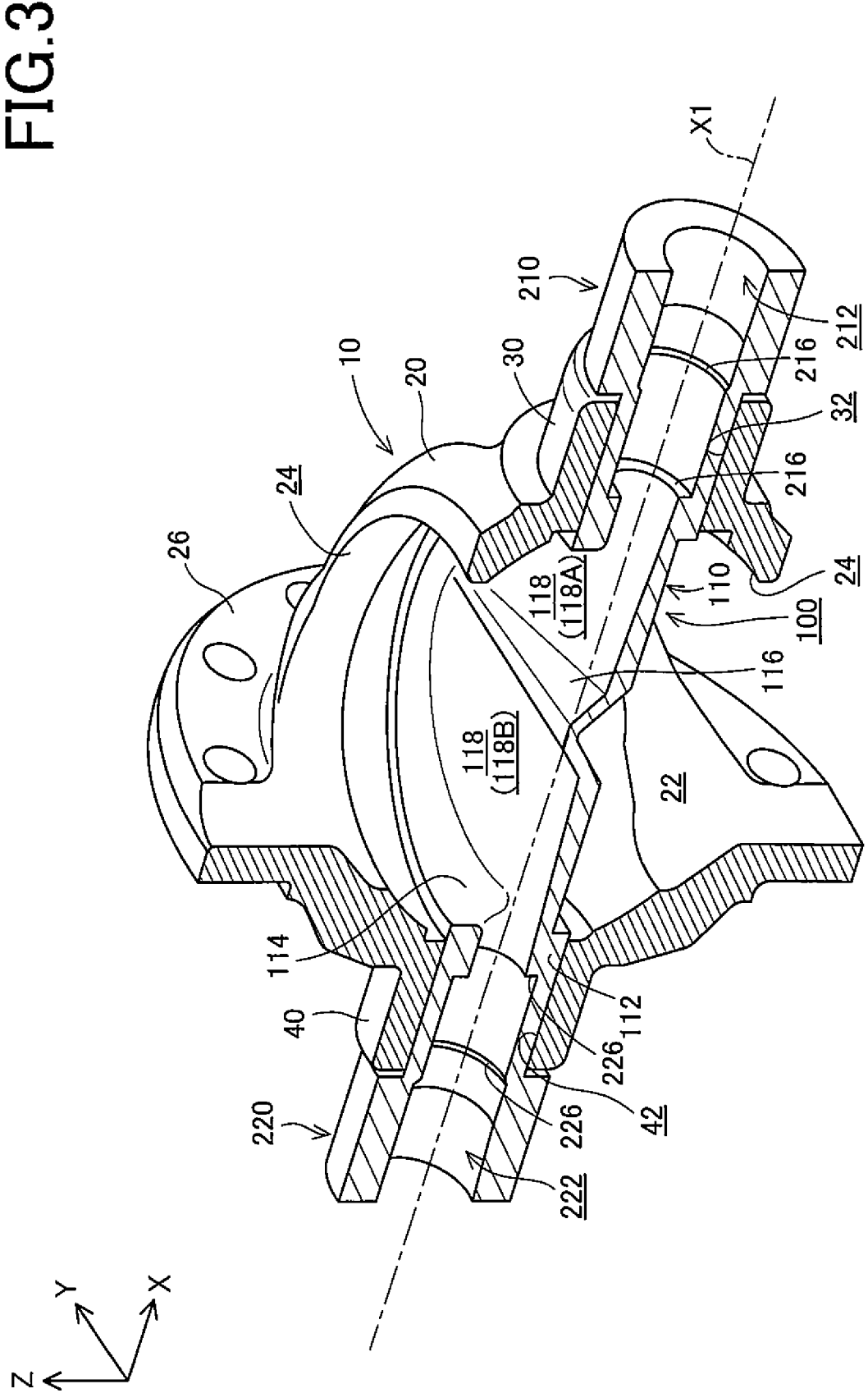
FIG. 3 is a perspective view illustrating a part of the differential device measuring tool 100 and a differential case 10 in the first embodiment.

As shown in FIG. 3, among other figures, to be described later, the right bearing boss 30 has a cylindrical shape in which a right through-hole 32 is formed, and is formed so as to protrude rightward from the right outer surface of the peripheral wall of the case main body 20. The left bearing boss 40 has a cylindrical shape in which a left through-hole 42 is formed, and is formed so as to protrude leftward from the left outer surface of the peripheral wall of the case main body 20. The right bearing boss 30 and the left bearing boss 40 both have a center axis that substantially coincides with the rotation axis X1. The right through-hole 32 of the right bearing boss 30 and the left through-hole 42 of the left bearing boss 40 both communicate with the housing space 22 of the case main body 20. The right bearing boss 30 is rotatably supported by the right bearing 5 arranged on the transmission case 2, and the left bearing boss 40 is rotatably supported by the left bearing 6 arranged on the transmission case 2. Thus, the differential case 10 is rotatable about the rotation axis X1 in the transmission case 2.

A-1-2. Configuration of Differential Gear Mechanism 50

The differential gear mechanism 50 includes a pinion shaft 52, a pair of pinion gears 54, a right side gear 56, and a left side gear 58. The pinion gears 54 and the side gears 56, 58 are both formed of a bevel gear. The pinion shaft 52 is disposed along a direction substantially orthogonal to the rotation axis X1, and both ends thereof are inserted into and fixed to a hole 23 (see FIGS. 5 and 6, below) formed through the peripheral wall of the case main body 20. The pair of pinion gears 54 are disposed so as to be separated from each other, and are rotatably supported on the pinion shaft 52. The number of pinion gears 54 is not limited to a pair, and may be, for example, three, four, or more. The pinion shaft 52 may be fixed, for example, to the ring gear 28 without being fixed to the differential case 10 (case main body 20). The fixing method is not limited to the same method as in the present embodiment, and may be, for example, a method using a fixing tool or welding.

The right side gear 56 is positioned to the right of the pair of pinion gears 54 and is disposed so as to mesh with both of the pair of pinion gears 54. The right side gear 56 is fixed to a right drive shaft 62 connected to a right axle (not shown), and is rotatable integrally with the right drive shaft 62. The left side gear 58 is positioned to the left of the pair of pinion gears 54 and is disposed so as to mesh with both of the pair of pinion gears 54. The left side gear 58 is fixed to a left drive shaft 64 connected to a left axle (not shown), and is rotatable integrally with the left drive shaft 64. It should be noted that the right drive shaft 62 is rotatably supported by the right hole 3 formed in the transmission case 2 through a seal member 7. The left drive shaft 64 is rotatably supported by the left hole 4 formed in the transmission case 2 via the seal member 7.

With the configuration described above, in the differential device 1, when power from a power source (not shown) is transmitted to the transmission to rotate the output gear 8, the ring gear 28 meshed with the output gear 8 rotates. When the ring gear 28 rotates, the differential case 10 rotates around the rotation axis X1 in accordance with the rotation of the ring gear 28. When the differential case 10 rotates, the right drive shaft 62 and the left drive shaft 64 are rotationally driven via the pair of pinion gears 54 and the pair of side gears 56, 58, respectively.

In the transmission case 2, the lubricating oil U is stored, for example, to a predetermined position below the rotation axis X1 in a stopped state in which the differential case 10 is not rotated. That is, in the stop state of the differential case 10, a part of the differential case 10 below the rotation axis X1 is immersed in the stored lubricating oil U. When the differential case 10 rotates, the lubricating oil U is scattered in the transmission case 2 in accordance with the rotation of the differential case 10, a part of the scattered lubricating oil U bounces against the inner wall of the transmission case 2, for example, flows into the housing space 22 of the case main body 20 through the access window 24 formed in the case main body 20, and is supplied to the differential gear mechanism 50. For example, as shown in FIG. 1, when the access window 24 of the case main body 20 opens upward, most of the lubricating oil U bounced off the upper inner wall of the transmission case 2 flows into the housing space 22 of the case main body 20 through the access window 24. Further, when the access window 24 of the case main body 20 opens laterally, most of the lubricating oil U bounced off the lateral inner wall of the transmission case 2 flows into the housing space 22 of the case main body 20 through the access window 24. This suppresses the occurrence of seizure and damage, among other problems, of the component members of the differential gear mechanism 50, and maintains the smooth operation of the differential gear mechanism 50. Other portions of the lubricating oil U scattered in the transmission case 2 are supplied between the bearing bosses 30, 40 and the bearings 5, 6 of the differential case 10. This suppresses the occurrence of seizure and damage, among other problems, of the bearing bosses 30, 40, among other components, and maintains the smooth operation of the differential case 10.

A-2. Configuration of Measuring Tool 100

Figure 4:
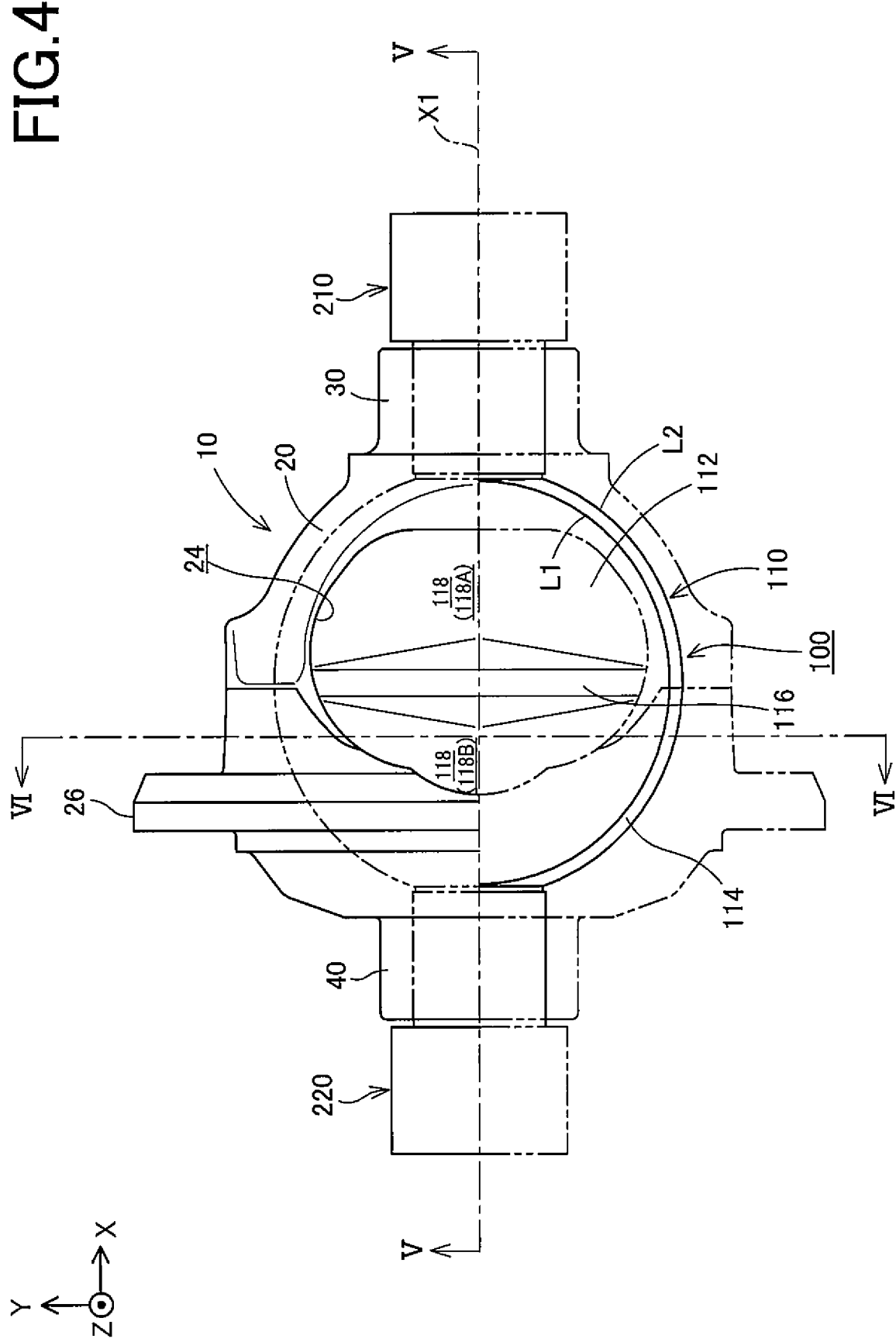
FIG. 4 is a plan view illustrating the differential device measuring tool 100 and the differential case 10 in the first embodiment.
Figure 5:
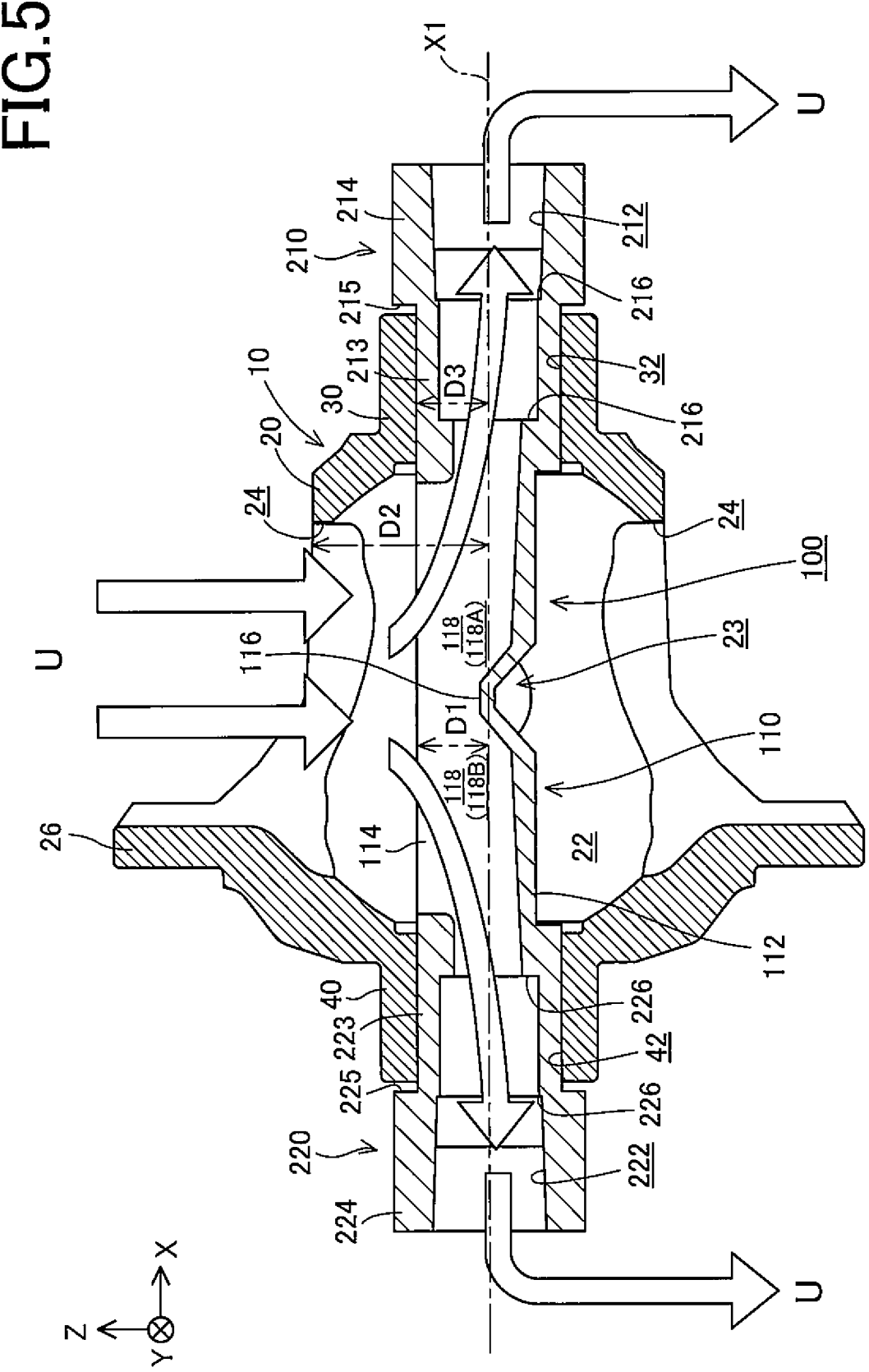
FIG. 5 is a cross-sectional view illustrating the differential device measuring tool 100 and the differential case 10 in the first embodiment.
Figure 6:
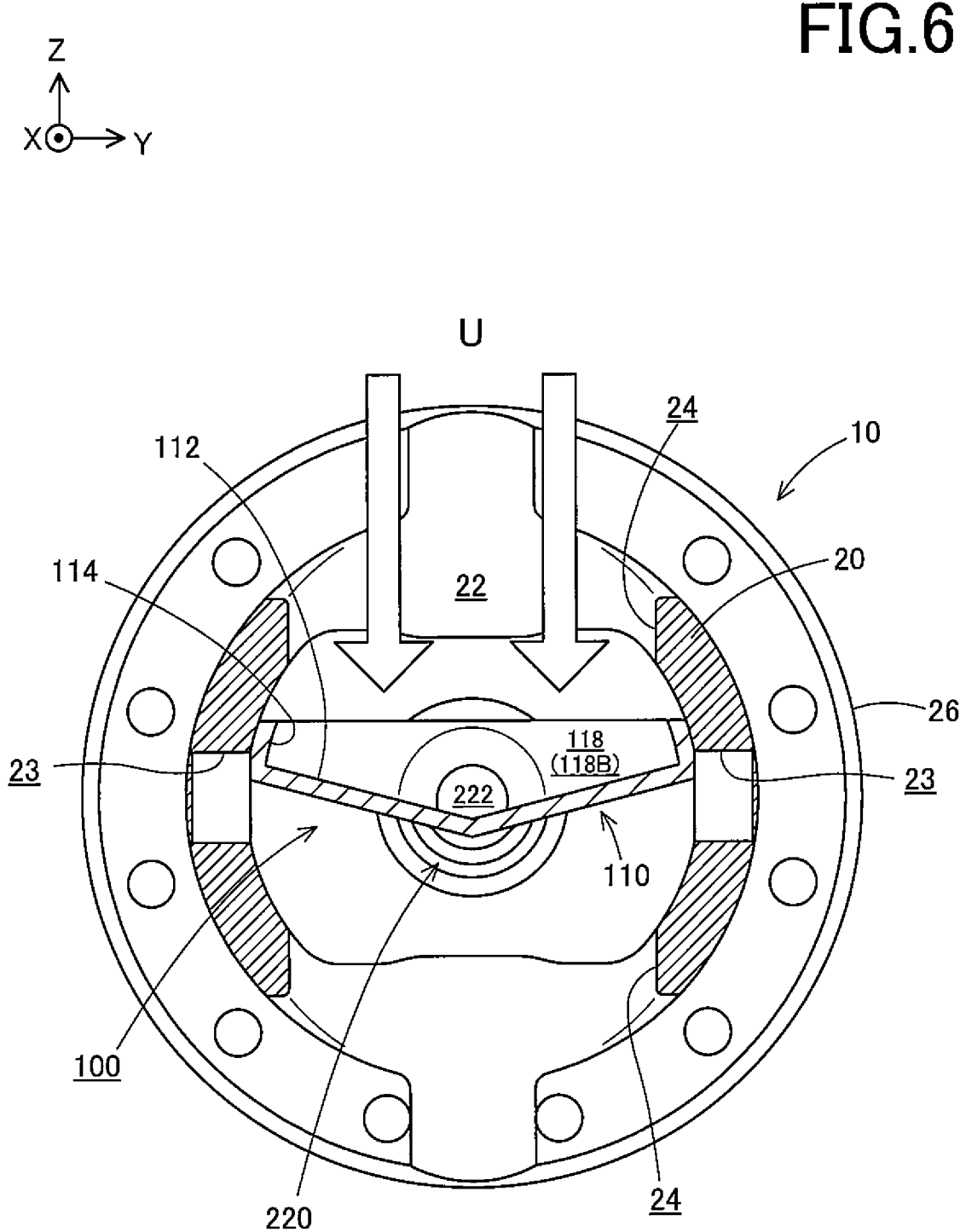
FIG. 6 is a cross-sectional view illustrating the differential device measuring tool 100 and the differential case 10 in the first embodiment.

FIG. 2 is a plan view illustrating a part of the measuring tool 100 according to the first embodiment. FIG. 2 shows, with respect to FIG. 1, a state in which the measuring tool 100 is disposed in place of the differential gear mechanism 50 in the housing space 22 of the case main body 20 in the differential case 10. FIG. 3 is a perspective view illustrating a part of the measuring tool 100 and the differential case 10 in the first embodiment. FIG. 3 shows a cross section of the measuring tool 100 and the differential case 10 in the XZ plane including the rotation axis X1. FIG. 4 is a plan view illustrating the measuring tool 100 and the differential case 10 in the first embodiment. FIG. 4 shows the measuring tool 100 and the differential case 10 in FIG. 3 viewed from above. In FIG. 4, a part of the differential case 10 and the measuring tool 100 is shown by two-dot chain lines. FIGS. 5 and 6 are cross-sectional views showing the measuring tool 100 and the differential case 10 in the first embodiment. FIG. 5 shows a cross section of the measuring tool 100 and the differential case 10 in line V-V of FIG. 4, and FIG. 6 shows a cross section of the measuring tool 100 and the differential case 10 in line VI-VI of FIG. 4. It should be noted that, in FIGS. 3 to 6, the ring gear 28 and the bolt 29 are omitted.

As shown in FIGS. 2 to 6, the measuring tool 100 includes a collecting portion 110, a right deriving portion 210, and a left deriving portion 220. The measuring tool 100 is made of, for example, resin or metal.

A-2-1. Configuration of Collecting Portion 110

The collecting portion 110 is arranged so as not to interfere with the rotating differential case 10 in the housing space 22 of the differential case 10. The collecting portion 110 has a recess 118, and the recess 118 opens in a direction substantially orthogonal to the rotation axis X1, and collects the lubricating oil U flowing into the housing space 22 through the access window 24 of the case main body 20. The following is a detailed explanation.

As shown in FIGS. 3 to 6, the collecting portion 110 has a saucer-like shape which is open upward, and includes a substantially flat plate-like bottom 112 and a peripheral wall 114 which is formed to rise upward from the peripheral edge of the bottom 112. In other words, the recess 118 of the collecting portion 110 is constituted by the bottom 112 and the peripheral wall 114. The outer shape of the collecting portion 110 as viewed from the recess 118 (upper side in FIGS. 3 to 6) corresponds to the shape of the inner wall of the differential case 10 on a virtual plane including the rotation axis X1. More specifically, the shape of the inner wall of the case main body 20 constituting the housing space 22 on the above-mentioned virtual plane is substantially circular, and the outer shape of the collecting portion 110 as viewed from the recess 118 is substantially circular accordingly. It should be noted that the shape of the bottom 112 as viewed from the recess 118 is substantially circular, and the shape of the peripheral wall 114 as viewed from the recess 118 is substantially annular.

As shown in FIG. 5, the collecting portion 110 is positioned substantially at the center in the vertical direction in the housing space 22 of the differential case 10. As shown in FIG. 4, in a state in which the access window 24 of the differential case 10 faces the recess 118 of the collecting portion 110, when the housing space 22 is viewed from the access window 24, the inner peripheral line L1 of the recess 118 (peripheral wall 114) of the collecting portion 110 coincides with the access window 24 or is positioned outside the access window 24 throughout the entire circumference. As a result, the collection rate of the lubricating oil U flowing into the housing space 22 through the access window 24 of the differential case 10 is improved, and the inflow amount of the lubricating oil U can be accurately measured.

The outer peripheral line L2 of the collecting portion 110 (peripheral wall 114) is located inside the inner wall of the case main body 20 on the above-mentioned virtual plane over the entire circumference. Therefore, the collecting portion 110 does not interfere with the rotating differential case 10 in the housing space 22. In the present embodiment, in the state shown in FIG. 4, the outer peripheral line L2 of the collecting portion 110 and the inner wall of the case main body 20 are close to each other throughout the entire circumference. The term "close" as used herein means that the outer peripheral line L2 of the collecting portion 110 (peripheral wall 114) and the inner wall of the case main body 20 are adjacent to each other with a gap therebetween that is as thin as a film of the lubricating oil U. Thus, the lubricating oil U flowing into the housing space 22 of the differential case 10 can be collected without leakage, and the inflow amount of the lubricating oil U can be measured with higher accuracy.

As shown in FIG. 5, the distance D1 between the open end (top end) in the recess 118 (peripheral wall 114) of the collecting portion 110 and the rotation axis X1 is preferably equal to or less than the shortest distance D2 between the access window 24 of the differential case 10 and the rotation axis X1, and is preferably equal to or more than the radius D3 of each of the deriving portions 210, 220. As a result, as compared with the case where the distance D1 of the recess 118 is longer than the shortest distance D2 between the access window 24 of the differential case 10 and the rotation axis X1, the access window 24 is less likely to be blocked by the peripheral wall 114 even if the differential case 10 rotates, and the inflow amount of the lubricating oil U can be more accurately measured. Further, as compared with the case where the distance D1 of the recess 118 is smaller than the radius D3 of each of the deriving portions 210, 220, the lubricating oil U can be reliably collected.

As shown in FIGS. 3 to 5, the recess 118 of the collecting portion 110 is divided into a right recess 118A and a left recess 118B by a partition 116. In this embodiment, the right recess 118A and the left recess 118B have the same shape and have the same volume. The partition 116 extends linearly in a direction (Y-axis direction) orthogonal to the rotation axis X1 as viewed from the recess 118 (upper side in FIGS. 3 to 6). Both ends of the partition 116 extend to the peripheral wall 114. The partition 116 is formed such that a part of the bottom 112 is raised upward.

As shown in FIG. 5, the bottom surface (top surface of the bottom 112) of the right recess 118A is inclined downward (direction away from rotation axis X1) from the partition 116 toward the right deriving portion 210. The bottom surface of the left recess 118B is inclined downward from the partition 116 toward the left deriving portion 220. As a result, the lubricating oil U collected in the recesses 118A, 118B can smoothly flow toward the respective deriving portions 210, 220.

As shown in FIG. 6, the bottom surfaces of the recesses 118A, 118B are inclined downward from the peripheral wall 114 toward the center of the bottom 112 when viewed in a direction (X-axis direction) along the rotation axis X1. As a result, it is possible to prevent the lubricating oil U once entering the recess 118 from bouncing back on the bottom surface of the recess 118 and jumping out of the recess 118. It should be noted that the bottom surface of the recess 118 (118A, 118B) may be inclined linearly or curvilinearly.

A-2-2. Configuration of Right Deriving Portion 210 and Left Deriving Portion 220

As shown in FIGS. 3 and 5, the right deriving portion 210 and the left deriving portion 220 are substantially cylindrical with the same size. The right deriving portion 210 is formed so as to protrude to the right from the right outer surface of the collecting portion 110 (peripheral wall 114), and is inserted into and supported by the right through-hole 32 of the right bearing boss 30 of the differential case 10. The leading end of the deriving side of the right deriving portion 210 extends to the outside of the right through-hole 32. The left deriving portion 220 is formed so as to protrude leftward from the left outer surface of the collecting portion 110, and is inserted into and supported by the left through-hole 42 of the left bearing boss 40 of the differential case 10. The leading end of the deriving side of the left deriving portion 220 extends to the outside of the left through-hole 42. The deriving portions 210, 220 are rotatable relative to the through-holes 32, 42 of the bearing bosses 30, 40, and the distal ends of the deriving portions 210, 220 are non-rotatably fixed outside the transmission case 2. Therefore, the measuring tool 100 is fixed in an attitude in which the recess 118 of the collecting portion 110 opens upward (see FIGS. 2 to 6), and the differential case 10 can rotate independently of the measuring tool 100.

As shown in FIG. 5, each of the deriving portions 210, 220 has small diameter portions 213, 223 disposed in each of the through-holes 32, 42 of each of the bearing bosses 30, 40 and having an outer diameter smaller than that of each of the through-holes 32, 42 and large diameter portions 214, 224 disposed outside each of the through-holes 32, 42 and having an outer diameter larger than that of each of the through-holes 32, 42. First stepped surfaces 215, 225 is formed between the small diameter portions 213, 223 and the large diameter portions 214, 224.

As shown in FIGS. 3 and 5, the hollow space in the right deriving portion 210 is a right deriving flow channel 212. The right deriving flow channel 212 communicates with the right recess 118A through a notch formed in the peripheral wall 114 of the collecting portion 110, and extends to the outside of the differential case 10 through the right through-hole 32 of the right bearing boss 30. The hollow space in the left deriving portion 220 is a left deriving flow channel 222. The left deriving flow channel 222 communicates with the left recess 118B through a notch formed in the peripheral wall 114 of the collecting portion 110, and extends to the outside of the differential case 10 through the left through-hole 42 of the left bearing boss 40.

As shown in FIG. 5, the bottom (valley) of the right deriving flow channel 212 is inclined downward (direction away from rotation axis X1) from the right recess 118A toward the deriving end (right edge) of the right deriving portion 210. The bottom (valley) of the left deriving flow channel 222 is inclined downward from the left recess 118B toward the deriving end (left edge) of the left deriving portion 220. As a result, the lubricating oil U flowing into each of the deriving flow channels 212, 222 from the recess 118 of the collecting portion 110 can be smoothly guided to the deriving side of each of the deriving flow channels 212, 222 by free fall due to its own weight. As shown in FIGS. 3 and 5, the bottom of each of the deriving flow channels 212, 222 is formed with two second stepped surfaces 216, 226 facing toward the deriving end of each of the deriving flow channel 212, 222. As a result, it is possible to prevent the lubricating oil U flowing into each of the deriving flow channels 212, 222 from flowing back toward the recess 118. It is preferable that the length, shape, and flow channel resistance of the right deriving flow channel 212 and the left deriving flow channel 222 are the same.

A-3. Lubricating Oil Amount Measuring Method for Differential Device 1 Using Measuring Tool 100

Figure 7:
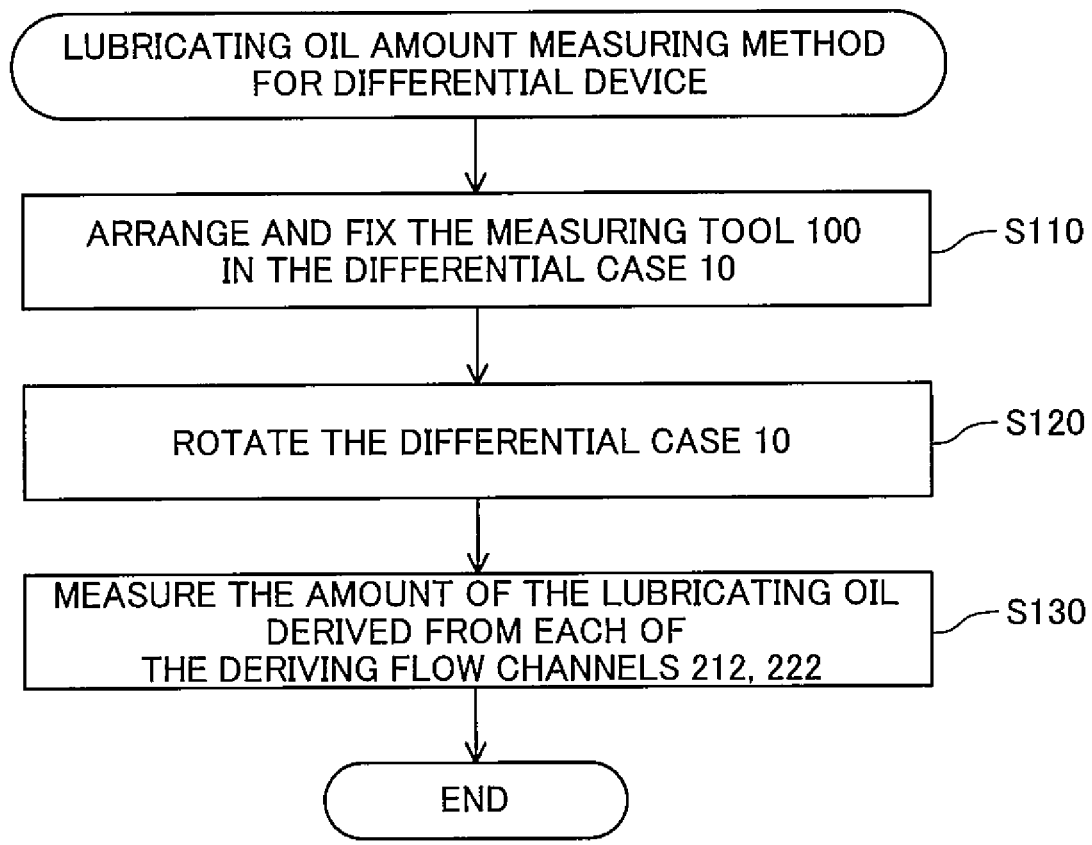
FIG. 7 is a flow chart showing a lubricating oil amount measuring method for the differential device 1 using the differential device measuring tool 100.

A lubricating oil amount measuring method for measuring the inflow amount of the lubricating oil U flowing into the housing space 22 through the access window 24 during the rotation of the differential case 10 using the measuring tool 100 will be described. This lubricating oil amount measuring method is carried out, for example, at the design and development stage of the differential case 10. FIG. 7 is a flowchart showing a lubricating oil amount measuring method using the measuring tool 100.

As shown in FIG. 7, first, the measuring tool 100 is arranged and fixed in the housing space 22 of the differential case 10 in which the differential gear mechanism 50 is not housed (fixing step S110). Specifically, as shown in FIG. 2, the measuring tool 100 is fixed in an attitude in which the recess 118 of the collecting portion 110 opens upward. A method for arranging the measuring tool 100 in the differential case 10 is as follows. For example, if the differential case 10 has a structure that can be disassembled into a plurality of components, the plurality of components are assembled after the measuring tool 100 is disposed between the disassembled plurality of elements. In the case where the differential case 10 has an integral structure that cannot be disassembled, the collecting portion 110 and the deriving portions 210, 220 are separately disposed in the differential case 10 in advance as separate units, and the collecting portion 110 and the deriving portions 210, 220 are thereafter joined together. Here, in order to reproduce the situation similar to the actual machine of the differential device 1, it is preferable that the hole 23 for fixing the pinion shaft 52 formed through the case main body 20 is closed with a sealing material, for example.

Next, the differential case 10 is rotated while at least a part of the case main body 20 of the differential case 10 is immersed in the lubricating oil U stored in the transmission case 2 (rotation step S120). Specifically, by supplying the lubricating oil U into the transmission case 2, for example, a part of the differential case 10 below the rotation axis X1 is immersed in the lubricating oil U stored in the transmission case 2. Then, the power from the power source is transmitted to the transmission to rotationally drive the output gear 8, thereby rotating the differential case 10. As a result, the lubricating oil U is scattered in the transmission case 2 in accordance with the rotation of the differential case 10, and a part of the scattered lubricating oil U bounces against the inner wall of the transmission case 2, for example, and flows into the housing space 22 of the case main body 20 through the access window 24 formed in the case main body 20, and is collected in the collecting portion 110 of the measuring tool 100 (see white arrows in FIGS. 5 and 6).

Then, during the rotation step, the amount of the lubricating oil U derived from each of the right deriving flow channel 212 and the left deriving flow channel 222 is measured (measurement step S130). Specifically, the amount of the lubricating oil U derived from the right deriving flow channel 212 per unit time and the amount of the lubricating oil U derived from the left deriving flow channel 222 per unit time are individually measured. Thus, the lubricating oil amount measuring method for the differential device 1 is completed. It should be noted that the amount of the lubricating oil U flowing into the housing space 22 through the access window 24 of the differential case 10 per unit time varies depending on the rotation speed of the differential case 10. Therefore, it is preferable that the rotation speed of the differential case 10 is increased stepwise every predetermined time by the transmission to measure the deriving amount of the unit time (for example, one minute) of the lubricating oil U at each rotation speed.

A-4. Example of Use of Measurement Results of Deriving Amount of Lubricating Oil U (Lubricating Oil Amount)

The measurement result of the derived amount of the lubricating oil U (lubricating oil amount) can be used for the design and development of the differential case 10 as follows, for example.

(1) Design of Access Window Area of Access Window 24 in Differential Case 10

In the differential device 1 in which the differential gear mechanism 50 is housed as shown in FIG. 1, in order to smoothly operate the differential gear mechanism 50, it is assumed that the inflow amount per unit time of the lubricating oil U to be flown into the housing space 22 from the access window 24 of the differential case 10 during rotation (hereinafter referred to as "reference inflow amount") is known. During the rotation of the differential case 10, the sum of the deriving amounts of the lubricating oil U per unit time from both the right deriving flow channel 212 and the left deriving flow channel 222 is measured, and if the sum of the deriving amounts of the lubricating oil U is smaller than the reference inflow amount, seizure and damage, among other problems, might occur in the differential gear mechanism 50. Therefore, it would be determined that the design should be changed to increase the access window area of the access window 24 in the differential case 10, for example. On the contrary, when the sum of the derived amounts is much larger than the reference inflow amount, it would be determined that the strength of the differential case 10 can be improved by changing the design so as to reduce the access window area of the access window 24 in the differential case 10, for example. Further, it can be determined that, if the sum of the derived amounts is equal to or larger than the reference inflow amount, it is not necessary to further reduce the surface roughness of the respective gears constituting the differential gear mechanism 50, for example.

(2) Left-Right Balance Design of Access Window 24 in Differential Case 10

When the amount of the lubricating oil U derived per unit time from the right deriving flow channel 212 is substantially the same as the amount of the lubricating oil U derived per unit time from the left deriving flow channel 222, it can be determined that the lubricating oil U is supplied to the differential gear mechanism 50 with a good left-right balance. On the contrary, for example, when the amount of the lubricating oil U derived per unit time from the right deriving flow channel 212 is larger than the amount of the lubricating oil U derived per unit time from the left deriving flow channel 222, it can be determined that a larger amount of the lubricating oil U is supplied to the right side of the differential gear mechanism 50. In this case, it is determined that the design should be changed so that the access window area on the right side of the access window 24 in the differential case 10 is reduced or the access window area on the left side is increased.

It should be noted that, in the cases (1) and (2), the shape of the inner wall of the transmission case 2 may be changed or the lubricating oil U may be forcibly supplied toward the differential case 10, for example, without changing the design of the differential case 10.

A-5. Operation and Effect of Embodiment

For example, if the inflow amount of the lubricating oil U flowing into the housing space 22 through the access window 24 can be measured during the rotation of the differential case 10, it can be determined whether or not an appropriate amount of the lubricating oil U can be supplied to the differential gear mechanism 50.

As described above, the measuring tool 100 of this embodiment includes the collecting portion 110 and the deriving portions 210, 220. The collecting portion 110 is arranged so as not to interfere with the rotating differential case 10 in the housing space 22 of the differential case 10. The collecting portion 110 has a recess 118, and the recess 118 collects the lubricating oil U flowing into the housing space 22 through the access window 24 in accordance with the rotation of the differential case 10. The deriving portions 210, 220 are inserted into the through-holes 32, 42 of the bearing bosses 30, 40 of the differential case 10. The deriving portions 210, 220 have deriving flow channels 212, 222, and the deriving flow channels 212, 222 communicate with the recess 118 of the collecting portion 110 and extend to the outside of the differential case 10 through the bearing bosses 30, 40. The measuring tool 100 is arranged in the housing space 22 of the differential case 10, and is fixed in an attitude in which the recess 118 of the collecting portion 110 opens upward (S110 of FIG. 7). When the differential case 10 rotates (S120 of FIG. 7), the lubricating oil U scattered in accordance with the rotation of the differential case 10 flows into the housing space 22 through the access window 24 of the differential case 10, is collected in the recess 118 of the collecting portion 110, and is derived from the deriving portions 210, 220. Therefore, by measuring the amount of the lubricating oil U derived from the deriving portions 210, 220 (S130 of FIG. 7), the amount of the lubricating oil U flowing into the housing space 22 of the differential case 10 during rotation can be measured. As a result, it can be determined whether or not an appropriate amount of the lubricating oil U can be supplied to the differential gear mechanism 50 without actually confirming seizure and damage, among other problems, of each component member of the differential gear mechanism 50.

B. Second Embodiment

Figure 8:
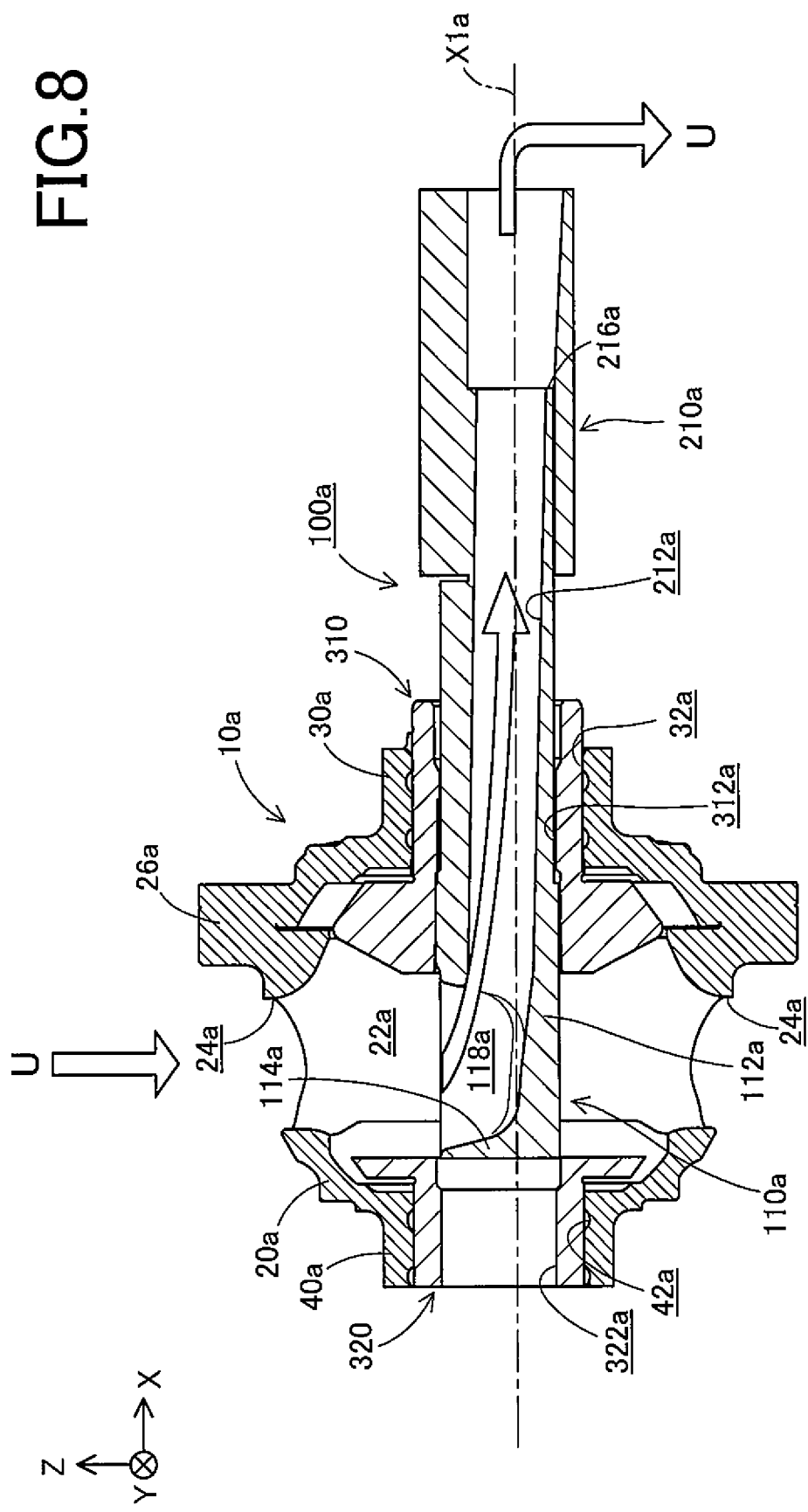
FIG. 8 is a cross-sectional view illustrating a differential device measuring tool 100a and a differential case 10a in a second embodiment.
Figure 9:
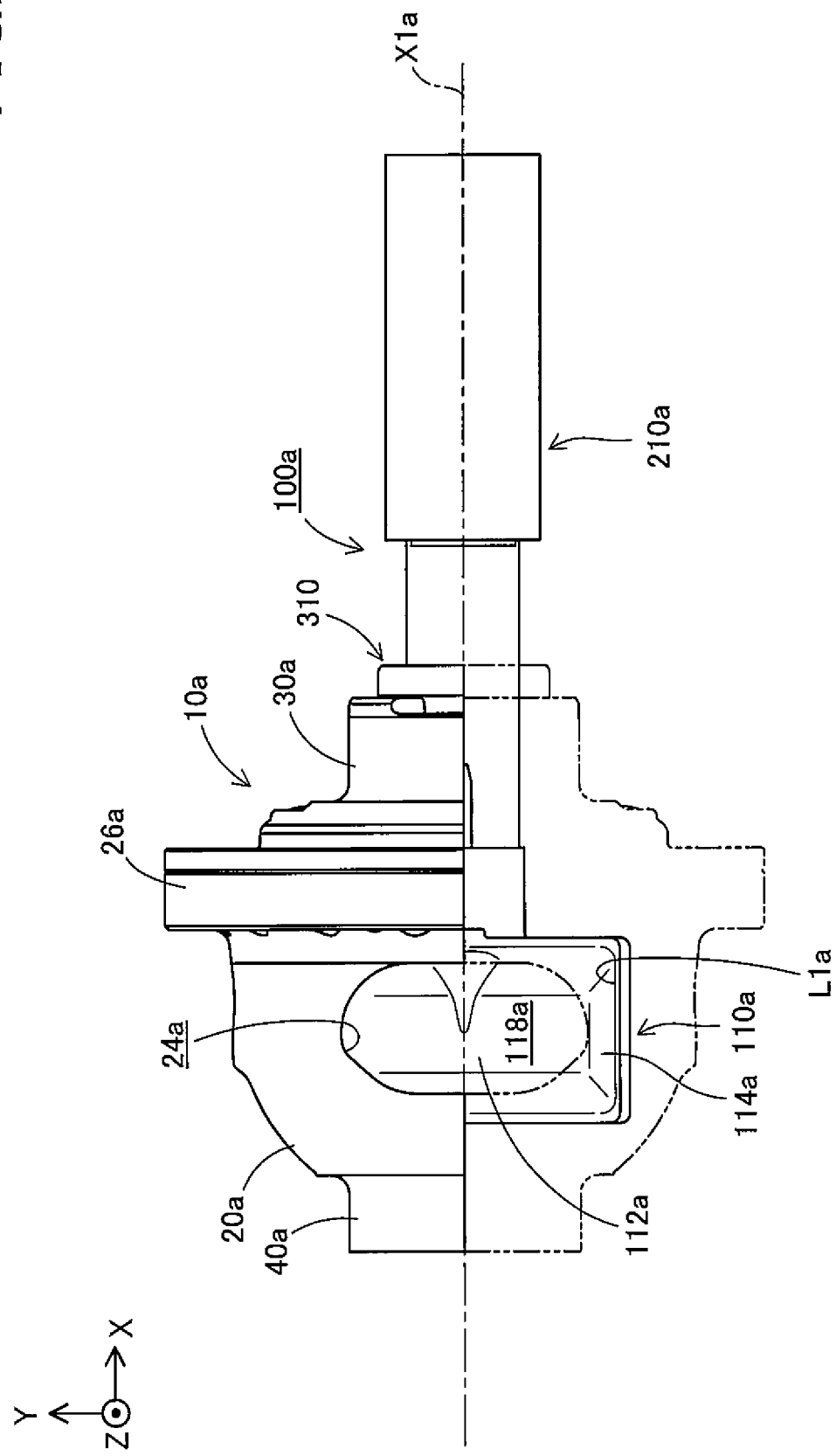
FIG. 9 is a plan view illustrating the differential device measuring tool 100a and the differential case 10a in the second embodiment.

FIG. 8 is a cross-sectional view illustrating a differential device measuring tool 100a (hereinafter simply referred to as "measuring tool 100a") and a differential case 10a in a second embodiment. FIG. 8 shows a cross section of the measuring tool 100a and the differential case 10a in the XZ plane. FIG. 9 is a plan view illustrating the measuring tool 100a and the differential case 10a in the second embodiment. It should be noted that only a part of the differential case 10a and a right jig 310 described later is shown in the drawings, and a part of the differential case 10a is shown by two-dot chain lines. In the configuration of the measuring tool 100a of the second embodiment, the same components as those of the measuring tool 100 of the first embodiment are denoted by the same reference numerals, and description thereof will be omitted.

The measuring tool 100a of the present embodiment is also arranged in place of a differential gear mechanism of a differential device (not shown), and is used to measure an inflow amount of the lubricating oil U flowing into a housing space 22a of the differential case 10a during rotation, as in the measuring tool 100 of the first embodiment.

B-1. Configuration of Differential Case 10a

As shown in FIGS. 8 and 9, the differential case 10a has a case main body 20a and a pair of bearing bosses (a right bearing boss 30a and a left bearing boss 40a).

The case main body 20a is, for example, a hollow substantially hemispherical body. The case main body 20a is formed with the housing space 22a for housing the differential gear mechanism. The peripheral wall of the case main body 20a is formed with a pair of access windows 24a that open from the housing space 22a to the outside of the case main body 20a. The pair of access windows 24a are formed in the peripheral wall of the case main body 20a at positions opposed to each other across the rotation axis X1a of the differential case 10a. The access window 24a is an example of the communication hole in the claims.

The outer peripheral surface of the case main body 20a is provided with an annular flange 26a centering on the rotation axis X1a, and a ring gear (not shown) is fastened to this flange 26a.

The right bearing boss 30a has a cylindrical shape in which a right through-hole 32a is formed, and is formed so as to protrude rightward from the right outer surface of the peripheral wall of the case main body 20a. The left bearing boss 40a has a cylindrical shape in which a left through-hole 42a is formed, and is formed so as to protrude to the left from the left outer surface of the peripheral wall of the case main body 20a. The right bearing boss 30a and the left bearing boss 40a both have a center axis that substantially coincides with the rotation axis X1a. The right through-hole 32a of the right bearing boss 30a and the left through-hole 42a of the left bearing boss 40a both communicate with the housing space 22a of the case main body 20a.

B-2. Configuration of Measuring Tool 100a

The measuring tool 100a includes a collecting portion 110a and one deriving portion 210a.

B-2-1. Configuration of Collecting Portion 110a

The collecting portion 110a is arranged so as not to interfere with the rotating differential case 10a in the housing space 22a of the differential case 10a. The collecting portion 110a has a recess 118a, and the recess 118a opens in a direction substantially orthogonal to the rotation axis X1a, and collects the lubricating oil U flowing into the housing space 22a through the access window 24a of the case main body 20a. The following is a detailed explanation.

As shown in FIGS. 8 and 9, the collecting portion 110a has a box-like shape opening upward, and includes a substantially flat plate-like bottom 112a and a peripheral wall 114a formed to rise upward from the peripheral edge of the bottom 112a. In other words, the recess 118a of the collecting portion 110a is constituted by the bottom 112a and the peripheral wall 114a. The outer shape of the collecting portion 110a as viewed from the recess 118a (upper side in FIGS. 8 and 9) corresponds to the shape of the inner wall of the differential case 10a on a virtual plane including the rotation axis X1a. More specifically, the shape of the inner wall of the case main body 20 constituting the housing space 22a on the above-mentioned virtual plane is a straight line on the left side (that is, the left interior wall is planar), and the outer shape of the collecting portion 110a as viewed from the recess 118a is substantially rectangular (see FIG. 9). The shape of the bottom 112a as viewed from the recess 118a is substantially rectangular, and the shape of the peripheral wall 114a as viewed from the recess 118a is substantially rectangular frame.

As shown in FIG. 8, the collecting portion 110a is positioned substantially at the center in the vertical direction in the housing space 22a of the differential case 10a. As shown in FIG. 9, in a state in which the access window 24a of the differential case 10a faces the recess 118a of the collecting portion 110a, when the housing space 22a is viewed from the access window 24a, the inner peripheral line L1a of the recess 118a (peripheral wall 114a) of the collecting portion 110a is positioned outside the access window 24a throughout the entire circumference. As a result, the collection rate of the lubricating oil U flowing into the housing space 22a through the access window 24a of the differential case 10a is improved, and the inflow amount of the lubricating oil U can be accurately measured.

As shown in FIG. 8, the bottom surface (top surface of the bottom 112a) of the recess 118a is inclined downward (direction away from the rotation axis X1a) toward the deriving portion 210a. As a result, the lubricating oil U collected in the recess 118a can smoothly flow to the deriving portion 210a.

B-2-2. Configuration of Deriving Portion 210a

As shown in FIGS. 8 and 9, the deriving portion 210a has substantially cylindrical shape. The deriving portion 210a is formed so as to protrude to the right from the right outer surface of the collecting portion 110a (peripheral wall 114a), and is inserted into the right through-hole 32a of the right bearing boss 30a of the differential case 10a. The leading end of the deriving side of the deriving portion 210a extends to the outside of the right through-hole 32a.

In this embodiment, the measuring tool 100a is supported via the right jig 310. The right jig 310 has a left portion disposed in the housing space 22a of the differential case 10a, a right portion inserted into the right through-hole 32a of the right bearing boss 30a, and is rotatable relative to the right through-hole 32a. A right insertion hole 312a is formed in the right jig 310, and the deriving portion 210a of the measuring tool 100a is inserted into and supported by this right insertion hole 312a. The leading end portion of the deriving portion 210a of the measuring tool 100a is non-rotatably fixed outside the transmission case, whereby the recess 118a of the collecting portion 110a is fixed to be opened upward, and the differential case 10a is rotatable independently of the measuring tool 100a. It should be noted that the measuring tool 100a is non-rotatably fixed to the right jig 310, thereby suppressing the wear caused by the relative rotation of the deriving portion 210a with respect to the right insertion hole 312a. However, the measuring tool 100a may be rotatable relative to the right jig 310. A left jig 320 is disposed on the left bearing boss 40a side of the differential case 10a. The right side portion of the left jig 320 is disposed in the housing space 22a of the differential case 10a, and the left side portion thereof is inserted into the left through-hole 42a of the left bearing boss 40a. A left insertion hole 322a is formed in the left jig 320. The left through-hole 42a of the left bearing boss 40a is closed by the left jig 320 and the collecting portion 110a. Thus, the differential gear mechanism is housed in the housing space 22a in a state similar to the actual differential device.

As shown in FIG. 8, the hollow space in the deriving portion 210a is a deriving flow channel 212a. The deriving flow channel 212a communicates with the recess 118a through a notch formed in the peripheral wall 114a of the collecting portion 110a, and extends to the outside of the differential case 10a through the right through-hole 32a of the right bearing boss 30a.

As shown in FIG. 8, the bottom (valley) of the deriving flow channel 212a is inclined downward (direction away from the rotation axis X1a) from the recess 118a toward the deriving side (right edge) of the deriving portion 210a. As a result, the lubricating oil U flowing into the deriving flow channel 212a from the recess 118a of the collecting portion 110a can be smoothly guided to the deriving side of the deriving flow channel 212a by free fall due to its own weight. The bottom of each of the deriving flow channels 212a is formed with a third stepped surface 216a facing toward the deriving end of the deriving flow channel 212a. As a result, it is possible to prevent the lubricating oil U flowing into the deriving flow channel 212a from flowing back toward the recess 118a.

B-3. Operation and Effect of Embodiment

The measuring tool 100a of the present embodiment is arranged in the housing space 22a of the differential case 10a, and is fixed in an attitude in which the recess 118a of the collecting portion 110a opens upward (see FIGS. 8 and 9). When the differential case 10a rotates, the lubricating oil U scattered in accordance with this rotation flows into the housing space 22a through the access window 24a of the differential case 10a, is collected in the recess 118a of the collecting portion 110a, and is derived from the deriving portion 210a. Therefore, by measuring the amount of the lubricating oil U derived from the deriving portion 210a, the amount of the lubricating oil U flowing into the housing space 22a of the differential case 10a during rotation can be measured. As a result, it can be determined whether or not an appropriate amount of the lubricating oil U can be supplied to the differential gear mechanism without actually confirming seizure and damage, among other problems, of each component member of the differential gear mechanism.

C. Modified Embodiment

The present invention is not limited to the embodiments described above, but can be modified into various forms without departing from the scope of the invention and, for example, the following modifications are also possible.

The configuration of the differential cases 10, 10a in the above embodiment is merely an example and can be variously modified. For example, in each of the above embodiments, the differential cases 10, 10a have a configuration in which a pair of access windows 24, 24a are formed, but for example, the differential cases may have a configuration in which only one access window is formed, a configuration in which three or more access windows are formed, or a configuration in which no access window is formed. Further, in each of the above embodiments, the access windows 24, 24a are exemplified as the communication holes, but the present disclosure is not limited thereto, and for example, in the first embodiment, a spiral groove may be formed in the inner peripheral surface constituting the through-holes 32, 42 of the bearing bosses 30, 40 of the differential case 10. In such a configuration, the lubricating oil U also flows into the housing space 22 of the differential case 10 by the screw pumping action due to the spiral shape of the groove in accordance with the relative rotation of the differential case 10 with respect to each of the deriving portions 210, 220 of the measuring tool 100, and is collected in the collecting portion 110 of the measuring tool 100.

The configuration of the measuring tool 100, 100a in the above embodiment is merely an example and can be variously modified. For example, in the first embodiment, the shape of the collecting portion 110 of the measuring tool 100 is a flat plate opening upward, but the shape is not limited thereto, and the shape may be a cup shape having a deep recess, for example. The outer shape of the collecting portion 110 as viewed from the recess 118 is not limited to a substantially circular shape, and may be, for example, a rectangular shape or an elliptical shape. Further, the shape of the bottom 112 as viewed from the recess 118 is not limited to a substantially circular shape, and may be, for example, a rectangular shape or an elliptical shape. The shape of the peripheral wall 114 as viewed from the recess 118 is not limited to a substantially annular shape, and may be, for example, a rectangular frame shape or an elliptical annular shape.

In each of the above embodiments, in a state in which the access windows 24, 24a of the differential cases 10, 10a faces the recesses 118, 118a of the collecting portion 110, 110a, when the housing spaces 22, 22a are viewed from the access windows 24, 24a, at least a part of the inner peripheral lines L1, L1a of the recesses 118, 118a of the collecting portions 110, 110a may be located inside the access windows 24, 24a.

In the first embodiment, at least a portion of the outer peripheral line L2 of the collecting portion 110 as viewed from the recess 118 of the measuring tool 100 and the inner wall of the case main body 20 in the differential case 10 need not be close to each other.

In the first embodiment, the distance D1 between the opening end of the recess 118 of the collecting portion 110 and the rotation axis X1 may be longer than the shortest distance D2 between the access window 24 of the differential case 10 and the rotation axis X1.

In the first embodiment, at least one of the shape and volume may be different between the right recess 118A and the left recess 118B.

In the first embodiment, for example, the recess 118 of the collecting portion 110 may not be separated but may have a single collecting space. The recess 118 may be divided into three or more recesses. In such a configuration, it is preferable that the deriving portion is formed with deriving flow channels that individually communicate with each of the three or more recesses. Thus, the inflow amount of the lubricating oil collected in each of the three or more recesses can be measured individually. A plurality of deriving flow channels may be formed in one deriving portion.

In the first embodiment, the partition 116 may extend in a direction inclined with respect to a direction orthogonal to the rotation axis X1 (Y-axis direction) as viewed from the recess 118, or may be curved. In addition, the recess 118 of the collecting portion 110 may be divided in the front-rear direction by a partition parallel to the rotation axis X1 when viewed from the recess 118, for example. By performing the lubricating oil amount measuring method for the differential device using the differential device measuring tool having such a configuration, the supply balance of the lubricating oil in the front-rear direction with respect to the differential gear mechanism can be grasped.

In the second embodiment, the recess 118a of the collecting portion 110a may be divided into a plurality of recesses, and deriving flow channels communicating with each of the recesses may be formed in one deriving portion 210a.

In each of the above embodiments, the bottom surfaces of the recesses 118, 118a may not be inclined downward (direction away from rotation axis X1) toward the deriving portions 210, 220, 210a. For example, the bottom surface of each of the recesses 118, 118a may be a flat surface.

In the first embodiment, at least one of the shape and the size of the right deriving portion 210 and the left deriving portion 220 may be different from each other. In each of the above embodiments, each of the deriving portions 210, 220, 210a may have a configuration other than a substantially cylindrical shape, such as a semicircular cross section, in which a groove constituting the deriving flow channel is formed on the upper surface.

In the above embodiments, the bottom (valley) of each of the deriving flow channels 212, 222, 212a may be horizontal from the recesses 118, 118a toward the deriving end of the deriving portions 210, 220, 210a, or may be inclined upward (direction approaching from rotation axis X1).

In the above embodiments, three or more of the stepped surfaces 216, 226, 216a may be formed on the bottoms of each of the deriving flow channels 212, 222, 212a or may not be formed at all.

The materials for forming the members in the measuring tools 100, 100a of the above embodiments are merely examples, and the members may be formed of other materials. In addition, the lubricating oil amount measuring method for the differential device using the measuring tools 100, 100a in each of the above embodiments is merely an example and can be variously modified.

What is claimed is:

1. A differential device measuring tool for measuring an inflow amount of a lubricating oil flowing into a housing space through a communication hole during rotation of a differential case that includes: a case main body having the housing space for housing a differential gear mechanism and the communication hole for communicating inside and outside of the housing space; and a cylindrical bearing boss protruding from the case main body, having a through-hole communicating with the housing space, and rotatably supported about a predetermined rotation axis, comprising:
    a collecting portion housed in the housing space where the differential gear mechanism is not housed, arranged so as not to interfere with the rotating differential case, and having a recess opened in a direction substantially orthogonal to the rotation axis for collecting a lubricating oil flowing into the housing space through the communication hole; and
    a deriving portion inserted into the through-hole of the bearing boss, and having a deriving flow channel, the deriving flow channel communicating with the recess of the collecting portion, and extending to the outside of the differential case through the bearing boss.

2. The differential device measuring tool according to claim 1,
    wherein, in a state in which the communication hole of the differential case faces the recess of the collecting portion, when the housing space is viewed from the communication hole, an inner peripheral line of the recess coincides with the communication hole or is positioned outside the communication hole throughout the entire circumference.

3. The differential device measuring tool according to claim 2,
    wherein an outer peripheral line of the collecting portion as viewed from the recess and an inner wall of the case main body on a virtual plane including the rotation axis are close to each other throughout the entire circumference.

4. The differential device measuring tool according to claim 2,
wherein a distance between an open end of the recess of the collecting portion and the rotation axis is equal to or less than the shortest distance between the communication hole of the differential case and the rotation axis.

5. The differential device measuring tool according to claim 2,
wherein the collecting portion has a plurality of the recesses, and the deriving portion is formed with a plurality of the deriving flow channels individually communicating with each of the plurality of recesses.

6. The differential device measuring tool according to claim 2,
wherein the bottom of the deriving flow channel is formed with a stepped surface facing toward the deriving end of the deriving flow channel.

7. The differential device measuring tool according to claim 1,
wherein an outer peripheral line of the collecting portion as viewed from the recess and an inner wall of the case main body on a virtual plane including the rotation axis are close to each other throughout the entire circumference.

8. The differential device measuring tool according to claim 7,
wherein a distance between an open end of the recess of the collecting portion and the rotation axis is equal to or less than the shortest distance between the communication hole of the differential case and the rotation axis.

9. The differential device measuring tool according to claim 7,
wherein the collecting portion has a plurality of the recesses, and the deriving portion is formed with a plurality of the deriving flow channels individually communicating with each of the plurality of recesses.

10. The differential device measuring tool according to claim 7,
wherein the bottom of the deriving flow channel is formed with a stepped surface facing toward the deriving end of the deriving flow channel.

11. The differential device measuring tool according to claim 1,
wherein a distance between an open end of the recess of the collecting portion and the rotation axis is equal to or less than the shortest distance between the communication hole of the differential case and the rotation axis.

12. The differential device measuring tool according to claim 11,
wherein the collecting portion has a plurality of the recesses, and the deriving portion is formed with a plurality of the deriving flow channels individually communicating with each of the plurality of recesses.

13. The differential device measuring tool according to claim 11,
wherein the bottom of the deriving flow channel is formed with a stepped surface facing toward the deriving end of the deriving flow channel.

14. The differential device measuring tool according to claim 1,
wherein the collecting portion has a plurality of the recesses, and the deriving portion is formed with a plurality of the deriving flow channels individually communicating with each of the plurality of recesses.

15. The differential device measuring tool according to claim 14,
wherein the bottom of the deriving flow channel is formed with a stepped surface facing toward the deriving end of the deriving flow channel.

16. The differential device measuring tool according to claim 1,
wherein a bottom of the recess of the collecting portion is inclined downward toward the deriving flow channel of the deriving portion.

17. The differential device measuring tool according to claim 1,
wherein the bottom of the recess is inclined downward toward the center of the bottom as viewed from a direction along the rotation axis.

18. The differential device measuring tool according to claim 1,
wherein the bottom of the deriving flow channel is inclined downward from the recess toward a deriving end of the deriving portion.

19. The differential device measuring tool according to claim 1,
wherein the bottom of the deriving flow channel is formed with a stepped surface facing toward the deriving end of the deriving flow channel.

20. A lubricating oil amount measuring method for a differential device for measuring an inflow amount of a lubricating oil flowing into a housing space through a communication hole during rotation of a differential case that includes a case main body having the housing space for housing a differential gear mechanism and the communication hole for communicating inside and outside of the housing space, and a cylindrical bearing boss protruding from the case main body, having a through-hole communicating with the housing space, and rotatably supported about a predetermined rotation axis, comprising:
a fixing step of fixing a differential device measuring tool that comprises a collecting portion housed in the housing space where the differential gear mechanism is not housed, arranged so as not to interfere with the rotating differential case, and having a recess opened in a direction substantially orthogonal to the rotation axis for collecting a lubricating oil flowing into the housing space through the communication hole, and a deriving portion inserted into the through-hole of the bearing boss, and having a deriving flow channel, the deriving flow channel communicating with the recess of the collecting portion, and extending to the outside of the differential case through the bearing boss in an attitude in which the recess of the collecting portion opens upward;
a rotating step of rotating the differential case; and
a measuring step of measuring the amount of lubricating oil derived from the deriving flow channel.

* * * * *